Jan. 26, 1960

F. C. DOBLE 2,922,951

HIGH VOLTAGE PHASE MEASUREMENTS

Original Filed April 9, 1956

Inventor
Frank C. Doble
by Robert S. Toperzer
Atty.

United States Patent Office 2,922,951
Patented Jan. 26, 1960

2,922,951

HIGH VOLTAGE PHASE MEASUREMENTS

Frank C. Doble, Belmont, Mass., assignor to Doble Engineering Company, Belmont, Mass., a corporation of Massachusetts Continuation of application Serial No. 577,115, April 9, 1956. This application March 10, 1958, Serial No. 720,324

6 Claims. (Cl. 324—83)

This invention relates generally to high voltage electrical systems, and in particular it is concerned with the derivation of phase information concerning such systems. The application is a continuation of my copending application Serial No. 577,115, now abandoned, filed April 9, 1956.

To specify the operating condition of an alternating current system, it is often necessary to make measurements of phase relations that exist in the system. Usually this does not present any special problem insofar as relatively low voltage systems are concerned since conventional phase indicating devices can be connected directly into the system. However, when dealing with high voltage systems, and by high voltage I mean the region above approximately ten thousand volts, the difficulty presented at the outset is, how safely to connect to the system in view of the insulation requirements that must be observed. Jeopardy to the system as well as to operating personnel virtually rules out altogether any form of direct connection to most high voltage lines because of the magnitude of the voltages combined with the tremendous amounts of power involved.

One possibility that suggests itself is the installation of voltage dropping resistors to furnish relatively low working voltages whose phase relations can be measured in a conventional manner. High voltage dropping resistors are very cumbersome and extremely costly however. They also take relatively large amounts of power which necessitates that they be large to dissipate the power as heat. Also a crucial defect of high voltage resistors from the standpoint of phase measurements is that they have appreciable leakage capacitance which is subject to change and which it is difficult if not impossible to correct for accurately. Hence, ordinarily, it cannot be assumed that the phase of the low voltage from such a resistor is correct unless, of course, there is no need to specify the phase relations under consideration with any degree of accuracy. In high voltage electrical systems just the converse is true, so that usually high-voltage resistors are seldom if ever used to obtain phase information.

As an alternative, potential transformers having high voltage primary windings and secondary windings which are adapted to provide suitable low working voltages have been used. However, such potential transformers have an inherent phase shift which varies significantly as a function of load, temperature, and other environmental conditions so that the phase of the low voltage derived by this means, may differ from that of the high voltage by as much as a degree or more. Moreover, high voltage potential transformers are expensive and bulky. Heretofore, the result has been that no practical way was available for making accurate phase measurements at various selected locations, especially in power systems where a knowledge of phase relations is often important for measurements and for load dispatching operations.

The present invention has as its object the provision of a method and apparatus for determining phase relations in high voltage electrical systems with an accuracy in the order of minutes.

A further object of the invention is to provide a method and apparatus of the above-mentioned character which is inherently simple, safe and reliable, and hence does not contribute to the likelihood of breakdowns and service interruptions.

A still further object of the invention is to provide a method and apparatus of the above-mentioned character which does not necessarily require that the system under consideration be de-energized at any time.

The novel features of the invention together with further objects and advantages thereof will become more readily apparent from a preferred embodiment illustrated in the accompanying drawing and described in detail hereinafter.

Figure 1:
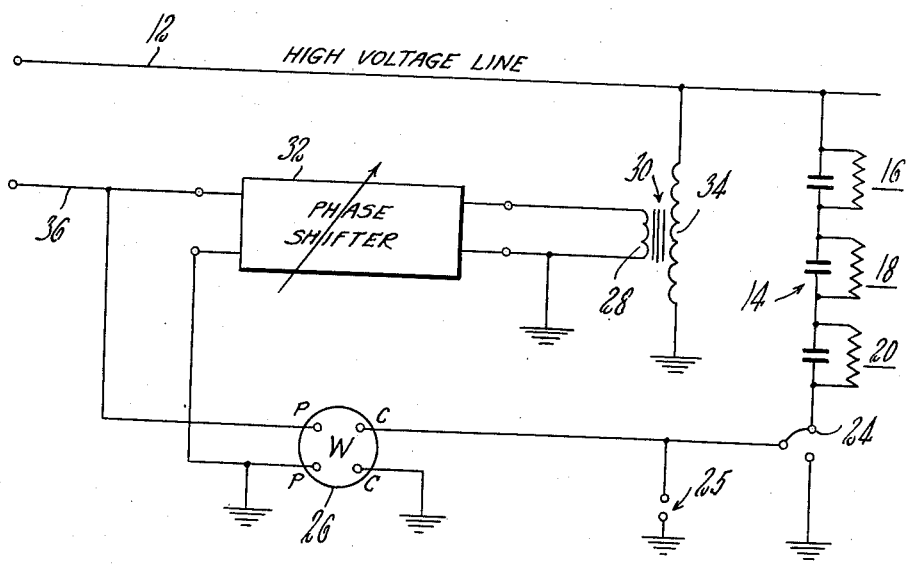
Fig. 1 is a schematic diagram of the apparatus according to the present invention.

In Fig. 1 there is shown a high voltage line 12, which by way of example may be assumed to be a part of a 110,000 volt power transmission system. Connected between the line 12 and ground is an impedance device 14 of known power factor or defect angle. Devices suitable for this purpose are capacitors of the type that are frequently employed in high voltage power systems to apply carrier current to the line for communication and telemetering purposes, and also bushings used to insulate the high voltage leads from the iron cases of circuit breakers and transformers. Such devices are usually made up of alternate layers of insulating and conductive material so as to form, in effect, individual capacitance sections that serve to divide the high voltage equally among the several insulating layers. Schematically, each section is represented by the parallel combination of a capacitor and a resistor. The resistor indicates the imperfect nature of the capacitance, or in other words its leakage resistance. Three such capacitance sections 16, 18 and 20 have been shown in the drawing, although it will be understood that ordinarily a capacitor designed for operation at 110,000 volts will have considerably more than three sections.

Figure 2:
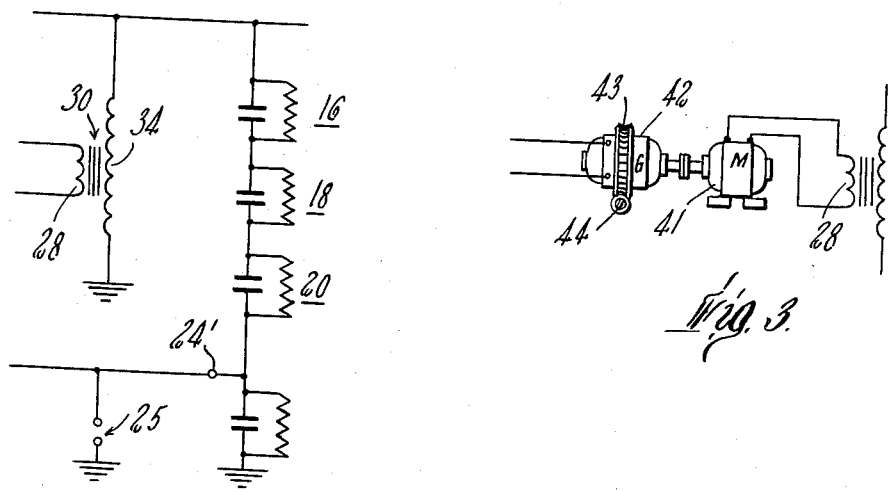
Fig. 2 is a schematic diagram of a modified impedance device suitable for use in the apparatus according to the invention.

According to the invention the low voltage end of the capacitor 14, as indicated by the terminal 24, instead of being connected directly to ground, is connected to ground through the current coil of a wattmeter 26. If a low voltage tap is available on the capacitor, it will usually be preferable to utilize this tap as the point of connection to the current coil leaving one end of the capacitor grounded. In effect the current coil will then be disposed in parallel relation to the remaining one or more capacitance sections between the tap and ground. This alternative arrangement has been shown in Fig. 2 wherein the numeral 24' refers to the low voltage tap. In either case, the current coil provides a low impedance path to ground for the charging current of the capacitor. Should this path be accidentally broken, there may also be provided between the terminal 24 (or 24') and ground, a protective device or gap 25 to prevent the voltage from becoming dangerously high at this point.

The potential coil of the wattmeter is connected through a phase shifting device 32 to a source of low voltage, such as 110 volts, which is locked in at the same frequency as the high voltage. In addition, the potential coil has one of its terminals connected to ground and the other of its terminals connected to a line 36. The source of low voltage may conveniently comprise a local 110 volt service outlet supplied from the same generating system as the high voltage. To represent a source of this kind, which is almost always readily available at a power station installation, there is shown in the drawing a transformer 30 through which the potential coil of the wattmeter 26 is energized. That is to say, transformer 30 has its primary winding 34 connected between the high voltage line 12 and ground, and its secondary winding 28 connected to the potential coil through the phase shifter 32. Preferably one terminal of the secondary winding 28 is grounded, as shown. In the normal case, there will be more than one such step-down transformer to provide the low voltage service, but this is obviously immaterial as regards the principles of the invention. Accordingly, the transformer 30 should be taken to represent not necessarily a single transformer, but as many step-down transformers as are generally employed for this purpose.

In operation, the phase of the low voltage on line 36 is caused to agree with that of the high voltage on line 12 so that any desired phase information, which involves the high voltage line, may be obtained through the use of ordinary low voltage measuring techniques. According to the invention, this adjustment is accomplished simply and safely, with due regard to the hazards normally associated with a high voltage power line. Thus, phase shifter 32 is adjusted until the power loss indicated by the wattmeter 26 corresponds to the actual power loss in the capacitor 14. The actual power loss may be determined in advance in accordance with the well known formula $W$ equals $VI \cos \theta$, where W is the power loss, V is the high voltage across the capacitor, I is the total current therein, and $\cos \theta$ is the known power factor of the capacitor. Ordinarily the impedance of the capacitor as well as its power factor will be known, so that the magnitude of the high voltage may be established through a measure of the current in the capacitor. An ammeter (not shown) may be connected in place of the current coil of the wattmeter to measure the current. Conversely, the current may be established on the basis of the capacitor impedance and the magnitude of the high voltage across the capacitor, as indicated by regular station equipment.

Once the wattmeter reading has been appropriately adjusted by means of the phase shifter so that the reading corresponds to the actual loss in the capacitor, it follows that the voltage on line 36 will have precisely the same phase as the high voltage. Since the line 36 carries a relatively low reference voltage, which is effectively isolated from the high voltage system by the capacitor, the line 36 may be used at will anywhere on the system without the attendant insulation problem that, as a practical matter, rules out the direct use of the high voltage for phase measuring purposes. If there is any shift in the phase of the reference voltage with respect to that of the high voltage, due to load changes on the low voltage service for example, then the phase shifter may be readjusted to compensate for such shifts as required.

Although the invention has been described in connection with a single reference voltage derived from a single high voltage conductor, it is contemplated that a reference voltage be derived in like manner from each high voltage conductor under consideration. The various reference voltages may then be compared in phase by any conventional means, such as a phase meter or synchroscope, to obtain whatever phase information is desired to be known about the system. In fact, it will be appreciated that other conventional phase sensitive devices than a wattmeter may optionally be employed in the apparatus of the invention to establish the phase of the reference voltage.

Figure 3:
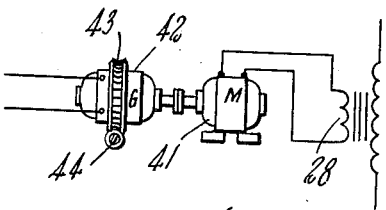
Fig. 3 is a schematic diagram of a modified phase shifting device suitable for use in the apparatus according to the present invention.

In Fig. 3 there is illustrated an alternative arrangement for deriving a suitable low working voltage which is locked in at the same frequency as the high voltage. Specifically, the secondary of the transformer 30 is connected to a synchronous motor 41 driving an A.C. generator 42. The generator in turn provides the requisite low voltage whose phase is to be made to agree with that of a high voltage. An advantage of this arrangement is that the generator itself may be adapted to serve as a phase shifting device simply by the provision of means to physically rotate the stator with respect to the rotor. This is illustrated diagrammatically by the gearing arrangement in the drawing including a gear wheel 43 on the stator and worm 44 disposed in driving relation to the gear wheel.

Various such modifications that are within the spirit and scope of the invention will no doubt occur to those skilled in the art, so that the invention should not be deemed to be limited to the details of what has been illustrated and described herein by way of example, but rather it should be deemed to be limited only by the scope of the appended claims.

What is claimed is:

1. Apparatus for establishing a low voltage in a given phase relation to an unknown high voltage, said apparatus comprising an impedance device of known defect angle connected to the high voltage to provide a point of relatively low potential a source of low voltage having the same frequency as the unknown high voltage, a phase sensitive device having a first input circuit coupled to the low voltage source and a second input circuit coupled between said point of low potential and ground to provide an indication of the phase difference between said low voltage and the current flowing through said impedance device, and means to shift the phase of said low voltage to cause the indicated phase difference to represent the combination of said given phase relation and said defect angle.

2. Apparatus for establishing a low voltage in phase with an unknown high voltage, said apparatus comprising an impedance device of known defect angle connected to the high voltage to provide a point of relatively low potential a source of low voltage having the same frequency as the unknown high voltage, a phase sensitive device having a first input circuit coupled to the low voltage source and a second input circuit coupled between said point of low potential and ground to provide an indication of the phase difference between said low voltage and the current flowing through said impedance device, and means to shift the phase of said low voltage to cause the indicated phase difference to represent said defect angle.

3. Apparatus for establishing a low voltage in phase with an unknown high voltage, said apparatus comprising an impedance device of known power loss connected to the high voltage to provide a point of relatively low potential a source of low voltage having the same frequency as the unknown high voltage, a wattmeter having a potential coil coupled to the low voltage source and a current coil coupled between said point of low potential and ground, and means to shift the phase of said low voltage to cause the power loss indicated by said wattmeter to represent the actual power loss in said impedance device.

4. Apparatus to provide a low voltage in phase with an unknown high voltage, said apparatus comprising an impedance device of known defect angle connected to the high voltage to provide a point of relatively low potential, a synchronous motor energized by a voltage derived from the high voltage, an alternating current generator in driven relation to said motor, a phase sensitive device having a first input circuit coupled to said generator and a second input circuit coupled between said point of low potential and ground to provide an indication of the phase difference between the generator voltage and the current flowing through said impedance device, and means to shift the phase of the generator voltage to cause the indicated phase difference to represent said defect angle.

5. Apparatus as claimed in claim 4 wherein said phase shifting means includes a mechanism to vary the angular relation between the rotor and stator of the generator.

6. Apparatus for use in combination with an impedance device of known defect angle connected to a high voltage line for establishing a low voltage in a given phase relation to the high voltage, said apparatus comprising a source of low voltage having the same frequency as the unknown high voltage, a phase sensitive device having a first input circuit coupled to the low voltage source and a second input circuit coupled between a point of relatively low potential on said impedance device and ground to provide an indication of the phase difference between said low voltage and the current flowing through said impedance device, and means to shift the phase of said low voltage to cause the indicated phase difference to represent the combination of said given phase relation and said defect angle.

References Cited in the file of this patent

UNITED STATES PATENTS

| | | |
|---|---|---|
| 1,617,912 | Kafka et al. | Feb. 15, 1927 |
| 1,688,790 | Cook | Oct. 23, 1928 |
| 1,728,835 | Petch | Sept. 17, 1929 |
| 1,894,338 | Austin | Jan. 17, 1933 |
| 1,994,279 | Higgins | Mar. 12, 1935 |
| 2,225,653 | Monk | Dec. 24, 1940 |
| 2,432,214 | Sontheimer | Dec. 9, 1947 |
| 2,436,479 | Luck | Feb. 25, 1948 |
| 2,600,204 | Carleton | June 10, 1952 |
| 2,694,794 | Blomqvist | Nov. 16, 1954 |
| 2,749,516 | Ragazzini | June 5, 1956 |
| 2,756,414 | Doremus | July 24, 1956 |
| 2,771,581 | Stolzenbach | Nov. 20, 1956 |

FOREIGN PATENTS

| | | |
|---|---|---|
| 526,491 | France | Oct. 8, 1921 |

OTHER REFERENCES

"Accurate Oscilloscope Phase Shift Measurements," article in Electronic Design, January 15, 1956, pages 34–35.